United States Patent
Masaki

(10) Patent No.: US 10,464,778 B2
(45) Date of Patent: Nov. 5, 2019

(54) CORD REEL DEVICE AND ELECTRONIC DEVICE

(71) Applicant: Panasonic Intellectual Property Management Co., Ltd., Osaka (JP)

(72) Inventor: Ryota Masaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/891,471

(22) Filed: Feb. 8, 2018

(65) Prior Publication Data
US 2019/0023523 A1  Jan. 24, 2019

(30) Foreign Application Priority Data
Jul. 21, 2017  (JP) .................. 2017-141475

(51) Int. Cl.
| | | |
|---|---|---|
| B65H 75/10 | (2006.01) | |
| B65H 75/44 | (2006.01) | |
| H02G 11/02 | (2006.01) | |
| B65H 75/18 | (2006.01) | |
| H01R 13/70 | (2006.01) | |

(52) U.S. Cl.
CPC ............. *B65H 75/10* (2013.01); *B65H 75/18* (2013.01); *B65H 75/4402* (2013.01); *B65H 75/4471* (2013.01); *H01R 13/70* (2013.01); *H02G 11/02* (2013.01); *B65H 2551/13* (2013.01); *B65H 2701/34* (2013.01); *H01R 2201/26* (2013.01)

(58) Field of Classification Search
CPC ................................ B65H 75/10; B65H 75/18
USPC ................................. 191/12 R, 12.4, 12.2 R
See application file for complete search history.

(56) References Cited

U.S. PATENT DOCUMENTS

| | | | | |
|---|---|---|---|---|
| 3,346,705 A * | 10/1967 | Slinkard | ................ | H02G 11/02 191/12.4 |
| 6,199,674 B1 * | 3/2001 | Liao | ................ | H02G 11/02 191/12.4 |
| 6,257,382 B1 * | 7/2001 | Liao | ................ | B65H 75/4434 191/12.2 R |
| 8,348,034 B2 * | 1/2013 | Fila | ................ | A61B 18/08 191/12.2 R |
| 2005/0236243 A1 * | 10/2005 | Huang | ................ | H02G 11/02 191/12.4 |

FOREIGN PATENT DOCUMENTS

JP  2006-347660  12/2006

* cited by examiner

*Primary Examiner* — Jason C Smith
(74) *Attorney, Agent, or Firm* — Wenderoth, Lind & Ponack, L.L.P.

(57) ABSTRACT

The cord reel device includes a reel body provided with a rotation shaft, a housing that stores inside the reel body in a rotatable manner, and a cord which is wound around the reel body so as to be extractable and which is extracted to an outside through an opening of the housing. The reel body has disk-shaped members on a plane perpendicular to the rotation shaft, and the cord is stored in a space formed between the disk-shaped members. A guide section inclined relative to the rotation shaft of the reel body is provided around peripheries of the disk-shaped members of the reel body. While the cord is wound around the reel body, the guide section guides the cord to the rotation shaft of the reel body.

8 Claims, 5 Drawing Sheets

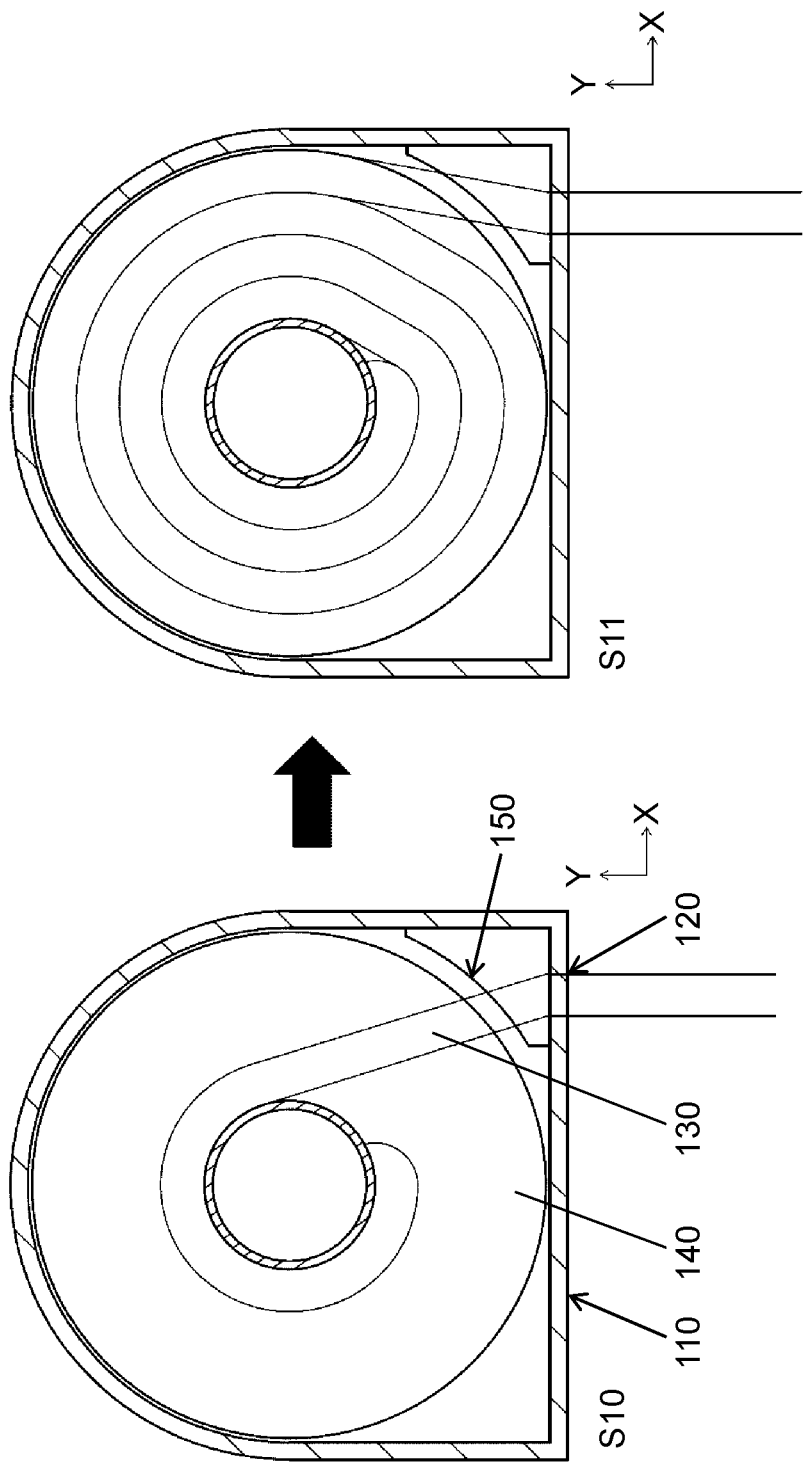

CORD REEL DEVICE AND ELECTRONIC DEVICE

BACKGROUND

1. Technical Field

The present disclosure relates to a cord reel device and an electronic device used for various types of long objects such as a cable for transmitting electric signals or the like, a hose, or a wire.

2. Description of the Related Art

PTL 1 discloses a cord reel device provided with a reel body that allows a long object to be wound there around, and having a structure for moving the long object to the center of the reel body. This cord reel device includes a reel body that allows a long object to be wound therearound, and a long object wound around the reel body so as to be extractable therefrom. The reel body is provided with a rotation shaft and disk-shaped flange sections which face each other in a vertical direction, and the long object is wound along the disk-shaped flange sections. The disk-shaped flange sections each have, on inner surfaces facing each other, a reversely tapered part which gradually protrudes toward an outer periphery from a center core side.

With this configuration, when the long object is accumulated on the inner surface of the disk-shaped flange section, the accumulated long object automatically moves to the center core side due to an acute inclination angle of the reversely tapered part and tension, so that the accumulated long object collapses. Thus, this configuration can prevent the long object from being unevenly accumulated on the inner surface of the disk-shaped flange section.

CITATION LIST

Patent Literature

PTL 1: Unexamined Japanese Patent Publication No. 2006-347660

SUMMARY

Conventional cord reel devices may include a device in which a reel body is provided with a complicated mechanism or a movable member to constantly store a long object. However, such a conventional cord reel device has a problem of having an increased reel body in size due to the structure mounted to the inside of the reel body or a problem of having poor reliability due to the complicated structure.

In view of this, the present disclosure provides a cord reel device and an electronic device effective for storing a long object in a reel body with the position of the long object being stabilized without being affected by a winding direction, while having a storage capacity suitable for a size of an exterior of the reel body.

The cord reel device according to the present disclosure includes a reel body provided with a rotation shaft, a housing that can store inside the reel body in a rotatable manner and has an opening, a cord which is wound around the reel body so as to be extractable and which is extracted to an outside through the opening of the housing, and a guide section which is disposed around an outer periphery of the reel body and is inclined relative to the rotation shaft to guide the cord to be stored in the reel body.

The cord reel device according to the present disclosure is effective for storing a long object in the reel body with the position of the long object being stabilized without being affected by a winding direction, while having a storage capacity suitable for a size of an exterior of the reel body. According to the effect described above, the size of the exterior of the reel body can be designed to be suitable for the long object, whereby reduction in size of the cord reel device can be expected. In addition, the long object can be stored in the reel body with the position thereof being stabilized, whereby a winding problem is less likely to occur. Thus, the cord reel device has high reliability and is useful. Furthermore, the cord reel device has the above-mentioned function with a simple structure without using a movable component, thereby being capable of further improving the reliability.

BRIEF DESCRIPTION OF THE DRAWINGS

FIG. 4 is a plan view of the cord reel device according to the first exemplary embodiment along an XY plane.

DETAILED DESCRIPTION

First Exemplary Embodiment

A first exemplary embodiment will be described below with reference to FIGS. 1 to 4.

[1-1. Configuration]

[1-1-1. Configuration of Cord Reel Device]

Figure 1:
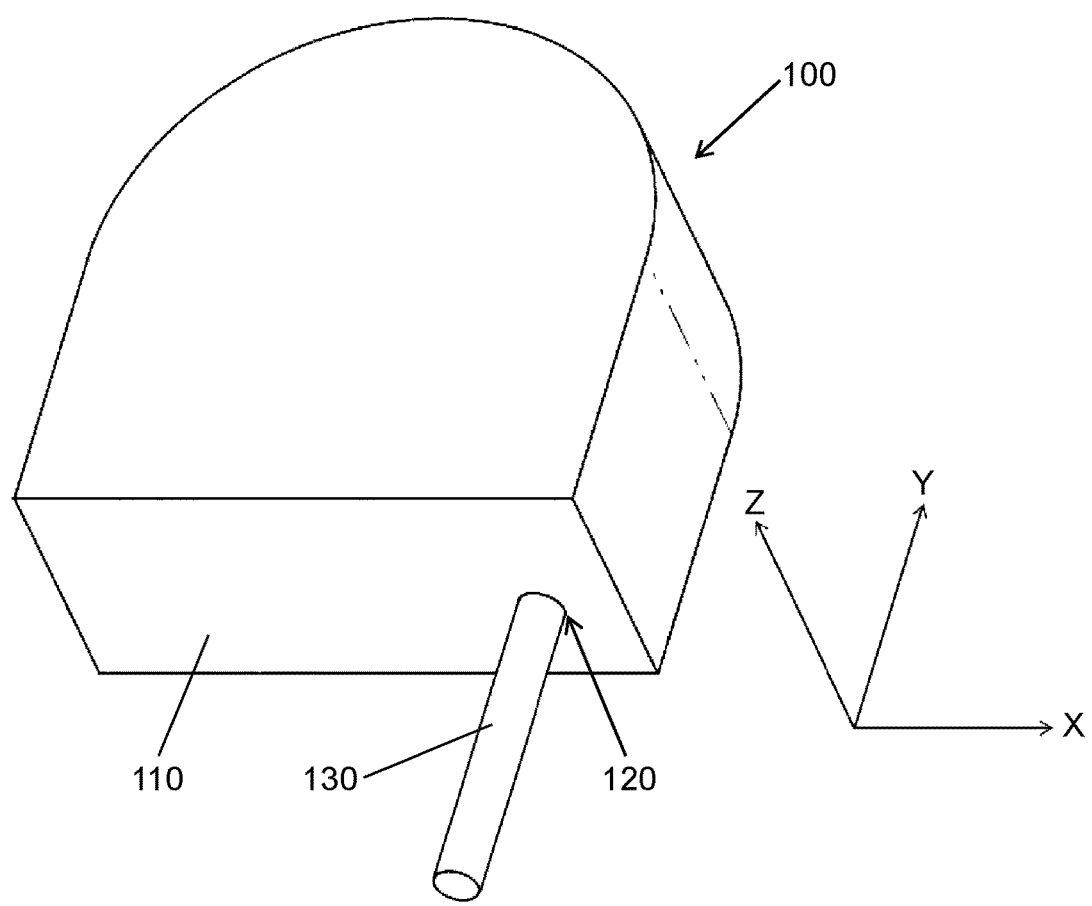
FIG. 1 is a perspective view of a cord reel device according to a first exemplary embodiment.
Figure 2:
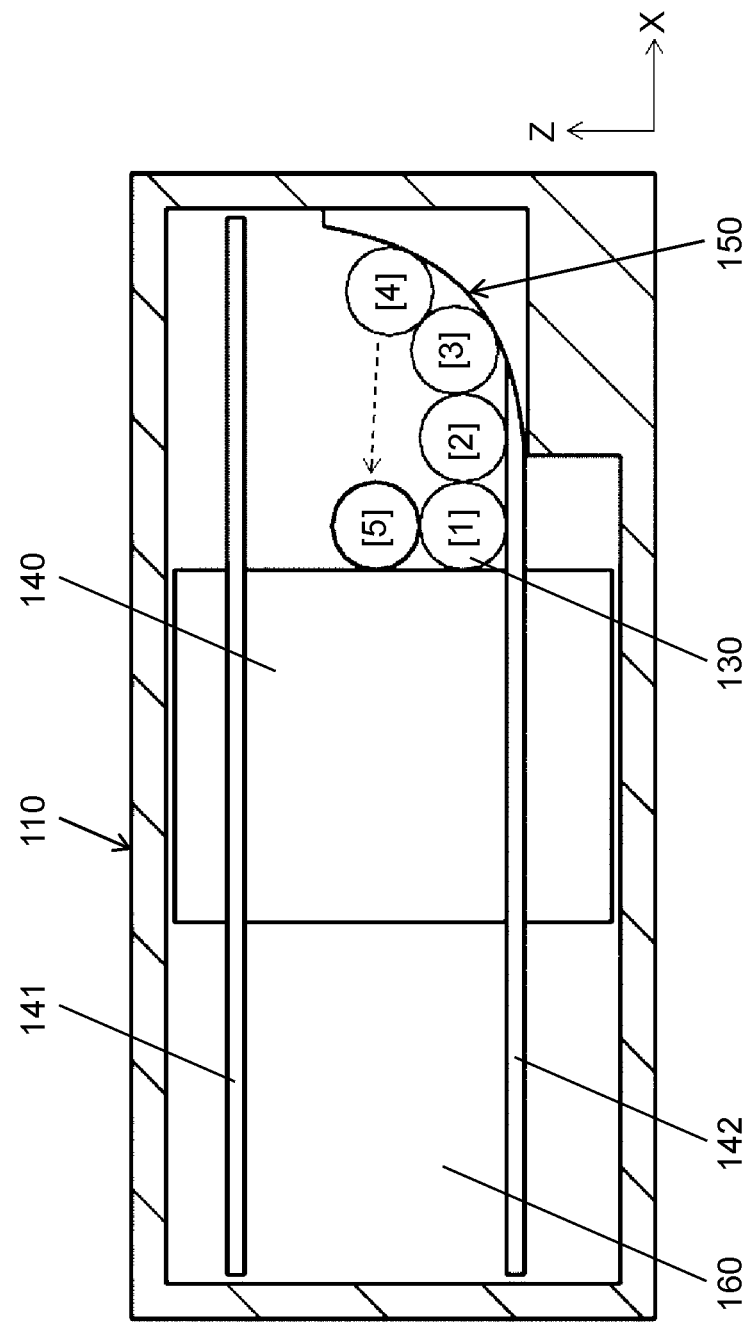
FIG. 2 is a plan view of the cord reel device according to the first exemplary embodiment along an XZ plane.

FIG. 1 is a perspective view of a cord reel device according to the first exemplary embodiment. FIG. 2 is a plan view of the cord reel device according to the first exemplary embodiment along an XZ plane.

Cord reel device 100 includes reel body 140 provided with a rotation shaft, housing 110 that stores inside reel body 140 in a rotatable manner, and cord 130 which is wound around reel body 140 so as to be extractable and which is extracted to an outside through opening 120 of housing 110.

Reel body 140 has disk-shaped members 141 and 142 which are perpendicular to the rotation shaft, and cord 130 is stored in space 160 formed between disk-shaped members 141 and 142.

Guide section 150 inclined relative to the rotation shaft of reel body 140 is provided around outer peripheries of disk-shaped members 141 and 142 of reel body 140. Guide section 150 may be formed as a part of housing 110, or may be formed as a separate component.

Figure 3:
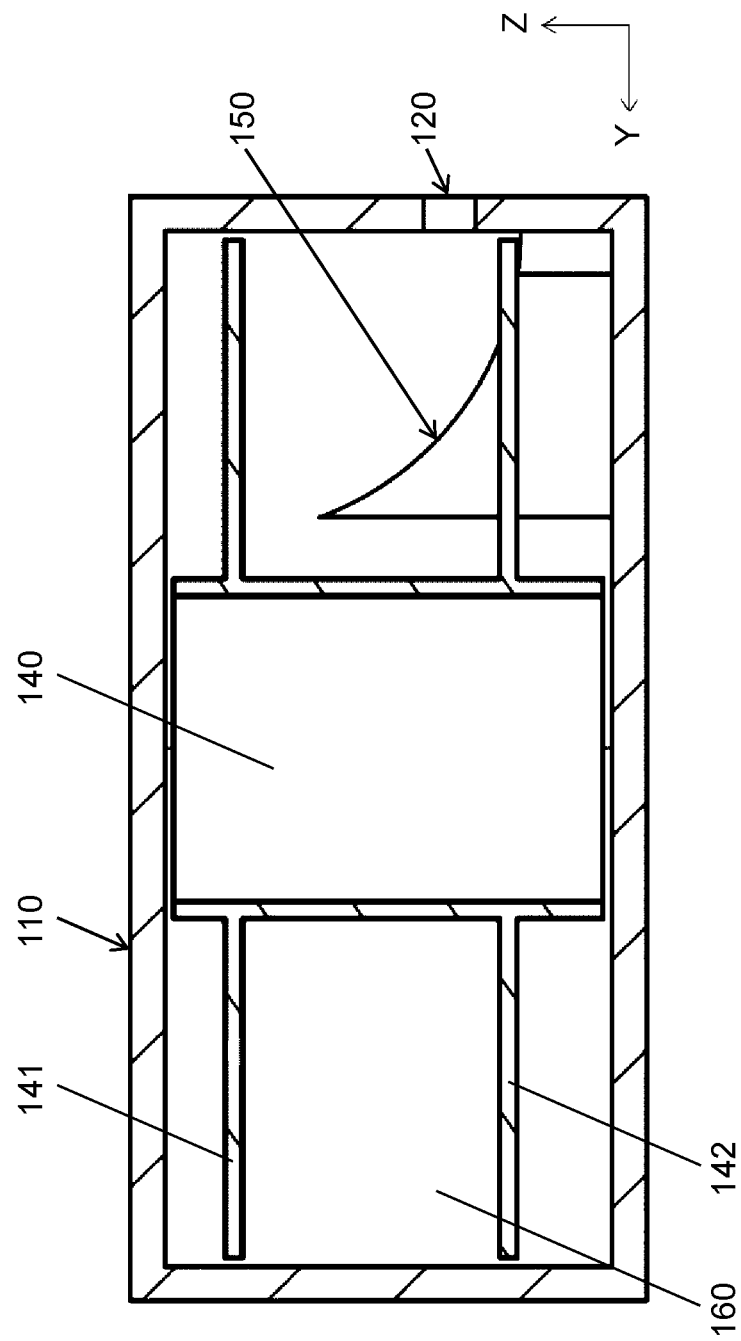
FIG. 3 is a plan view of the cord reel device according to the first exemplary embodiment along a YZ plane.

FIG. 3 is a plan view of the cord reel device according to the first exemplary embodiment along a YZ plane. Guide section 150 is inclined to be increased in height (in a positive direction of a Z axis) in a depth direction (positive direction of a Y axis) which is the direction from opening 120 toward the center of the rotation shaft of reel body 140. An opening area of opening 120 is set to be a sectional area of cord 130.

[1-2. Operation]

An operation of cord reel device 100 configured as described above will be described below. Cord reel device 100 enables extracting cord 130 and rewinding cord 130. Each of the operations will be described in detail below.

[1-2-1. Operation of Cord Reel Device]

One end of cord 130 is fixed to reel body 140 as illustrated in FIG. 2, and the opposite end protrudes outward through opening 120 of housing 110 as illustrated in FIG. 1. Cord reel device 100 enables extracting cord 130 and rewinding cord 130. Reel body 140 rotates independently of housing 110, by which cord 130 is stored in space 160 formed between disk-shaped members 141 and 142 perpendicular to the rotation shaft of reel body 140, while being wound around the rotation shaft of reel body 140. Cord 130 passes through guide section 150, when being stored in space 160 in reel body 140.

Guide section 150 is inclined relative to the rotation shaft of reel body 140, so that cord 130 moves along an inclined surface of guide section 150 in the positive direction of the Z axis with the progression of the rewinding operation.

As illustrated in FIG. 2, at the start of the operation for rewinding cord 130, cord 130 is directly wound around the rotation shaft of reel body 140 as indicated by [1]. Then, with the progression of the rewinding operation, cord 130 is wound along the cord which has been previously wound, so that the cord is sequentially wound toward the outer periphery of reel body 140 (in a positive direction of an X axis) in the order of [2] and [3]. Guide section 150 guides the cord in the positive direction of the Z axis as indicated by [4] during the winding toward the outer periphery, thereby guiding cord 130 to a portion of the rotation shaft of reel body 140 where the cord has not yet been wound, as indicated by [5].

Further, as illustrated in FIG. 3, the cross section of opening 120 can be minimized by inclining guide section 150 such that the height of guide section 150 increases (in the positive direction of the Z axis) toward the inside of housing 110 (in the positive direction of the Y axis) from opening 120.

FIG. 4 is a plan view of the cord reel device according to the first exemplary embodiment along an XY plane. Guide section 150 is provided near opening 120 of housing 110 and around outer peripheries of disk-shaped members 141 and 142 of reel body 140. Specifically, guide section 150 is disposed near opening 120 of housing 110 at a position where a square that includes a circle defining the outer shape of reel body 140 and has four sides of a length equal to the diameter of the circle does not overlap the circle.

FIG. 4 illustrates S10 indicating a state upon the start of rewinding cord 130 which has been pulled in through minimized opening 120 and S11 indicating a state upon the end of rewinding cord 130. As illustrated in S10, upon the start of the rewinding operation, cord 130 is wound around the center shaft, or the rotation shaft, of reel body 140 while passing through a lower part of the inclination of guide section 150. On the other hand, at the end of the rewinding operation, cord 130 which is to be wound next is guided to a higher part of the inclination of guide section 150 by utilizing the shape of cord 130 which has been previously wound, as indicated in S11. In short, cord 130 moves along the inclination of the guide section 150 due to a change in a winding diameter caused while storage of cord 130 into reel body 140 progresses. At that time, due to guide section 150 being inclined toward the inside of housing 110 (in the positive direction of the Y axis) as illustrated in FIG. 3, cord 130 is gently guided, and the cord is prevented from becoming stuck near opening 120, whereby the opening area of opening 120 can be minimized.

[1-3. Effects and Other Benefits]

As described above, in the present exemplary embodiment, cord reel device 100 guides cord 130 with the progression of the rewinding operation by utilizing guide section 150 provided separately from reel body 140, thereby being capable of appropriately utilizing the storage capacity of space 160 between the disk-shaped members in reel body 140.

According to this configuration, cord reel device 100 can be designed such that reel body 140 has an appropriate outer dimension, whereby reduction in size of cord reel device 100 can be expected. In addition, cord 130 can be stably guided to reel body 140 due to the guide function of guide section 150, which enables stable storage, whereby the reduction of a possibility of an occurrence of a winding problem can be expected.

In the present exemplary embodiment, guide section 150 is inclined toward the center of housing 110, and thus, cord 130 is gently guided. Accordingly, cord 130 becomes less stuck near opening 120, whereby the winding problem can be reduced, and minimizing the sectional area, or the opening area, of opening 120 can be achieved. Further, a degree of flexibility in designing the position of opening 120 is improved.

As described above, a flow of cord 130 can be stabilized by minimizing the sectional area, or the opening area, of opening 120. Thus, the winding problem can be reduced. According to the structure in which cord 130 is stored while moving through guide section 150 with the progression of the rewinding operation, the flow of cord 130 can further be stabilized, and thus, the reduction of the winding problem can be more significant. Furthermore, due to the sectional area, or the opening area, of the opening 120 being small, improvement in design of the exterior of the cord reel device can be expected.

In addition, the position where cord 130 is in contact with guide section 150 is changed with the progression of the rewinding operation of cord 130, which prevents a portion of guide section 150 from becoming extremely worn, whereby guide section 150 can be used over a long period.

In addition, due to the configuration in which guide section 150 is formed integrally with housing 110, the number of components can be reduced, whereby reduction in cost can be expected. Moreover, cord reel device 10 is provided with less engagement sections and coupling sections because of less number of components, whereby the improvement of reliability can be expected.

Other Exemplary Embodiments

The first exemplary embodiment has been described above as a specific example of the technique disclosed in the present application. However, the technique in the present disclosure is not limited thereto, and can also be applied to exemplary embodiments subjected to modification, substitution, addition, omission and the like. In addition, new exemplary embodiments can be made by combining constituents described in the above first exemplary embodiment.

Accordingly, other exemplary embodiments will be described below.

Figure 5A:
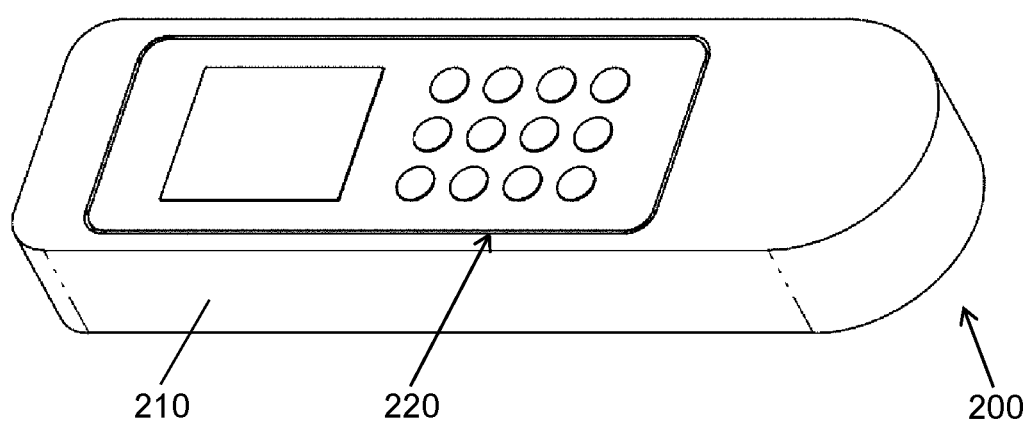
FIG. 5A is a perspective view illustrating an application of the cord reel device according to the first exemplary embodiment.
Figure 5B:
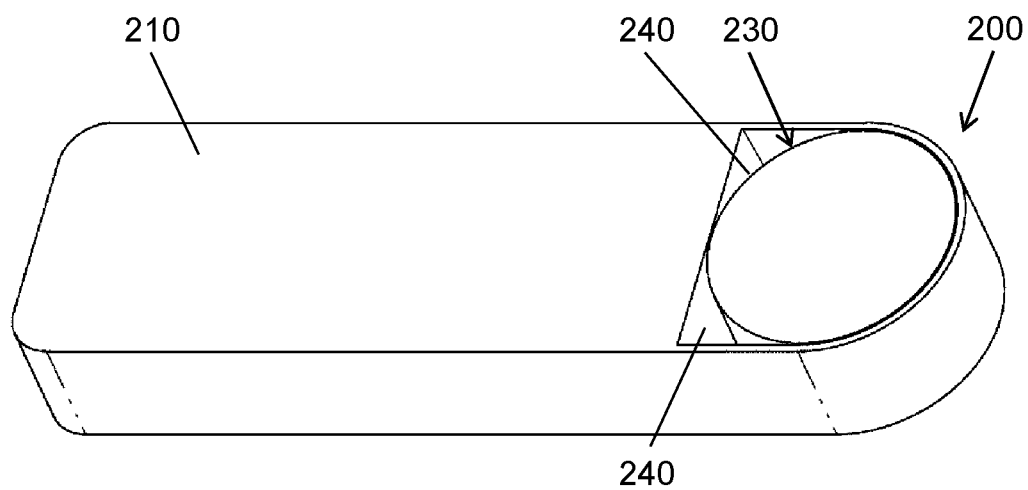
FIG. 5B is a perspective view illustrating an application of the cord reel device according to the first exemplary embodiment.

FIGS. 5A and 5B are perspective views illustrating an application of the cord reel device according to the first exemplary embodiment. Specifically, FIG. 5A illustrates an electronic device 200 in which a cord reel device 230 and a connection device 220 (for example, a controller that can be operated by an aircraft passenger) to which a cord of the cord reel device 230 is connected are integrally formed.

FIG. 5A illustrates a side of electronic device 200 where connection device 220 is held, and FIG. 5B illustrates a side of electronic device 200 where columnar cord reel device 230 is held.

Connection device 220 is substantially rectangular, and connected to a cord of cord reel device 230. Cord reel device 230 is disposed to be adjacent to connection device 220 in the longitudinal direction of connection device 220, and connection device 220 and cord reel device 230 are both stored in housing 210. The cord of connection device 220 can be extracted from cord reel device 230 and can be rewound.

Cord reel device 230 is generally configured to include a reel body provided with a rotation shaft inside and to have a columnar shape.

When columnar cord reel device 230 and other structures (herein, connection device 220) are used in combination as described above, space 240 is formed between cord reel device 230 and connection device 220. Further, space 240 is not particularly necessary, and often becomes a dead space.

In view of this, in the present application, guide section 150 is formed in space 240 between cord reel device 230 and connection device 220. Accordingly, when structures such as connection device 220 and cord reel device 230 are integrally formed, a dead space is effectively used, whereby electronic device 200 with an outer shape being unaffected can be provided. Thus, a compact product design can be expected.

In the first exemplary embodiment, a guide section having the inclination with a curved surface has been described as one example of the guide section. However, the guide section may only have an inclination. Therefore, the guide section is not limited to have a curved surface and the guide section may have an inclination with a flat surface.

In addition, it is effective to use a material having excellent sliding property for the guide section, because friction is caused every time cord 130 is extracted and rewound. Examples of such a material include a polyacetal resin. In a case where the cord reel device is installed to a place requiring heat resistance, such as an aircraft, it is assumed that ensuring heat resistance by using a material having excellent sliding property is difficult. To improve heat resistance, the guide section is provided as a separate component, which can reduce the use of a material having low heat resistance.

In addition, the sectional area, or the opening area, of the opening may not be minimized on the housing. The cord reel device may be configured such that the cord passes through a constant position inside the housing.

Moreover, the disk shape of the reel body may be defined by the housing.

The exemplary embodiment, as presented only by way of example of the technique according to the present disclosure, may include various modifications, replacements, additions, and omissions and the like, without departing from the scope of the appended claims and their equivalents.

The present disclosure is applicable to a device that allows a long object such as a transmission/reception cable for electric signals, a power cord, a rope, or a string to be wound around a storage section provided with a rotation shaft, such as a reel or a bobbin, for storage. Specifically, the present disclosure is applicable to a cord reel for a cable of an aircraft handset, a structure for winding and storing a power cord, and a structure for winding and storing a rope.

What is claimed is:

1. A cord reel device comprising:
   a reel body provided with a rotation shaft;
   a housing that stores the reel body inside in a rotatable manner and has an opening;
   a cord which is wound around the reel body so as to be extractable and which is extracted through the opening of the housing to an outside; and
   a guide section that is disposed around a periphery of the reel body,
   wherein the guide section includes an inclined surface, the inclined surface being inclined relative to the rotation shaft, and the inclined surface being in contact with the cord to guide the cord to be stored in the reel body.

2. The cord reel device according to claim 1, wherein the inclined surface is inclined in a depth direction which is a direction from the opening of the housing toward a center of the rotation shaft.

3. The cord reel device according to claim 1, wherein an opening area of the opening of the housing is set to be a sectional area of the cord.

4. The cord reel device according to claim 1, wherein the cord moves along an inclination of the inclined surface due to a change in a winding diameter caused while storage of the cord into the reel body progresses.

5. The cord reel device according to claim 1, wherein in a planer view, the guide section is disposed at a position where a square that includes a circle defining an outer shape of the reel body and has four sides of a length equal to a diameter of the circle does not overlap the circle.

6. An electronic device comprising:
   a cord reel device which includes a reel body provided with a rotation shaft, and a cord wound around the reel body so as to be extractable;
   a connection device connected to the cord and arranged adjacent to the cord reel device in a direction in which the cord is extracted; and
   a guide section that is disposed around a periphery of the reel body between the reel body and the connection device,
   wherein the guide section includes an inclined surface, the inclined surface being inclined relative to the rotation shaft, and the inclined surface being in contact with the cord to guide the cord to be stored in the reel body.

7. The electronic device according to claim 6, wherein
   the connection device is a controller having a rectangular shape and configured to be operated by an aircraft passenger,
   the cord reel device is disposed adjacent to the controller in a longitudinal direction of the controller, and
   the guide section is disposed between the reel body and the controller.

8. The cord reel device according to claim 1, wherein the inclined surface is positioned to guide the cord so that the cord is wound around the reel body.

* * * * *